United States Patent
Liu et al.

(10) Patent No.: US 6,606,214 B1
(45) Date of Patent: Aug. 12, 2003

(54) SYSTEM AND METHOD TO MINIMIZE BEARING PIVOT EFFECT IN DISC DRIVE ACTUATOR

(75) Inventors: Xiong Liu, Singapore (SG); Joseph Cheng-Tsu Liu, Singapore (SG); Choon Kiat Lim, Singapore (SG); Kevin Arthur Gomez, Singapore (SG)

(73) Assignee: Seagate Technology LLC, Scotts Valley, CA (US)

( * ) Notice: Subject to any disclaimer, the term of this patent is extended or adjusted under 35 U.S.C. 154(b) by 350 days.

(21) Appl. No.: 09/605,155

(22) Filed: Jun. 28, 2000

Related U.S. Application Data

(60) Provisional application No. 60/141,616, filed on Jun. 30, 1999.

(51) Int. Cl.⁷ .......................... G11B 5/596; G11B 21/02
(52) U.S. Cl. .............................. 360/77.02; 360/77.04; 360/75
(58) Field of Search .................... 360/48, 75, 77.04, 360/77.05, 77.07, 77.11, 77.03; 369/111

(56) References Cited

U.S. PATENT DOCUMENTS

| | | | |
|---|---|---|---|
| 4,318,141 A | 3/1982 | Haynes | |
| 4,530,021 A | 7/1985 | Cameron | |
| 4,628,379 A | 12/1986 | Andrews, Jr. et al. | |
| 4,764,914 A | * 8/1988 | Estes et al. | 369/58 |
| 5,166,850 A | 11/1992 | Dolby et al. | |
| 5,355,268 A | 10/1994 | Schulze | |
| 5,608,586 A | * 3/1997 | Sri-Jayantha et al. | 360/77.04 |
| 5,828,522 A | 10/1998 | Brown et al. | |
| 6,002,549 A | 12/1999 | Berman et al. | |
| 6,069,764 A | * 5/2000 | Morris et al. | 360/77.04 |
| 6,128,153 A | * 10/2000 | Hasegawa et al. | 360/77.08 |

* cited by examiner

*Primary Examiner*—Andrew L. Sniezek
(74) *Attorney, Agent, or Firm*—David K. Lucente; Derek J. Berger

(57) ABSTRACT

A disc drive is provided which incorporates a rotatable actuator which is mounted to a base of the disc drive through a pivot mechanism. The actuator positioning is controlled by a servo system and during track following operations, the actuator arm is caused to move. In one embodiment, the servo tracks incorporated in the disc drive are distorted when written in by the injection of a sinusoidal signal. In another form, the disc containing the servo information is caused to rotate about an axis which is offset from the disc axis. A method of creating a servo track is also disclosed.

20 Claims, 8 Drawing Sheets

SYSTEM AND METHOD TO MINIMIZE BEARING PIVOT EFFECT IN DISC DRIVE ACTUATOR

This patent application claims priority from U.S. Provisional Application No. 60/141,616 filed Jun. 30, 1999.

FIELD OF THE INVENTION

The present invention relates generally to disc drives and more specifically to hard disc drives (HDD) that include rotatable actuators.

BACKGROUND OF THE INVENTION

The rotary actuator in a HDD is typically supported by a bearing pivot mechanism consisting of two preloaded ball bearings. The actuator is used to position magnetic transducers (heads) over selected information bearing tracks on the discs. The transducers have to be positioned with great precision and the actuator positioning is controlled by a closed loop servo system with its movement being driven by a voice coil motor (VCM). The feedback in the control loop is through the transducer reading servo information prewritten on the disc. During track following or track to track seek operations, the pivot bearing may rotate less than one minute to as much as 20° in an inner to outer radius seek or reverse.

The friction torque generated in the bearings adversely affects the servo control system, especially in high density track applications. In modeling of the HDD actuator, the actuator is often simplified as a double integrator $P(s)=K/s^2$. However, the non linear response of the actuator's ball bearing affects the form of the transfer function. In particular, there is insufficient gain at the lows frequency and the gain at the low frequency reduces with decreasing the actuator motion. As a result of this, the servo system is unable to handle high track density applications with ball bearing pivot mechanisms.

Various alternatives such as knife edge type pivots have been proposed to meet this problem. One example is disclosed in U.S. Pat. No. 5,355,268 entitled "Disc drive knife edge pivot" by D M Shultz, granted Oct. 11 1994. Other alternatives such as micro actuators, or modified actuator arm designs such as that disclosed in U.S. Pat. No. 5,166,850 entitled "Rigid, wedge-shaped mounting structure for minimizing resonances to allow rapid transverse movement of an attached head" have also been proposed.

A problem with such proposals is that major changes are required to existing designs, which increase manufacturing costs and also time to market.

SUMMARY OF THE INVENTION

The present invention provides a disc drive which includes a system to minimize the effect of bearing friction and which may be easily incorporated into existing disc drive designs.

In accordance with one embodiment of the invention there is provided a disc drive which includes a rotatable disc operative to include a plurality of data storage tracks. A rotatable actuator assembly is mounted via a pivot mechanism to a base of the hard disc drive and this assembly includes an actuator body and a transducer mounted on the actuator body. A voice coil motor is operatively connected to the actuator arm and operable to position the transducer over a selected storage track during a track following operation where the transducer is able to retrieve data from, or store data on, the selected track. The radial distance between the center line of the selected data storage track and the spindle axis varies on angular displacement about the spindle axis so that the actuator arm is operable to move about the pivot mechanism during the track following operation.

In previous disc drive systems, the data storage tracks are circular and concentric about the axis of rotation of the disc thereby enabling the actuator arm to be stationery during the track following operation. The center line of the data storage tracks are typically defined by servo information which is prewritten into the disc of the disc drive, and which is used in operation of the disc drive by the controlling servo system. However, by maintaining the actuator arm in motion during track following operations, it is possible to increase the gain at the low frequency and also to minimize the gain variation with the amplitude change of the actuator motion. This enables the servo system associated with the disc drive to be able to be used on discs having higher track density applications than previously possible, using existing designs incorporating ball bearing pivot mechanisms.

In another embodiment of the invention, there is provided a method of retrieving data from, or storing data on, a data storage track of a disc drive. The method includes providing a rotatable actuator assembly which is mounted via a pivot mechanism to a base of the disc drive and which includes an actuator body and a transducer. The method also includes positioning the transducer over a data storage track during a track following operation, and causing the actuator assembly to pivot about the pivot mechanism during the track following operation where the transducer retrieves data from, or stores data on, the storage track.

In one form, the data storage tracks are defined to be non circular about the disc's axis of rotation so as to cause the actuator arm to pivot during the track following operation. This may be achieved in different ways. In one arrangement the disc incorporates circular data storage tracks but the disc is designed to rotate about an axis which is offset from the central axis of the data storage tracks. In another form, the data storage tracks are defined to be non-circular about the axis of rotation of the disc. This is preferably controlled by the servo information which defines the center line of the data storage tracks which is written in during servo track writing of the hard disc drive.

Preferably, the position of the data storage track is defined by servo track information which is written into the disc drive. In one form, a time varying signal is injected in during this servo track writing. Preferably this signal is a periodic time varying signal and the spindle rotation frequency or its harmonic frequencies are selected as the frequency of the written in periodic signal. In a preferred form the signal is sinusoidal.

Preferably, at the time of writing in the signal into the servo track, a correction factor for the servo system is created and stored and utilized by the servo system during track following operation. Preferably, the same amplitude and phase synchronized signal is written in for all tracks to thereby ensure that no additional track squeeze is generated.

Preferably the amplitude of movement of the actuator arm during track following operations is in the range of $(100-300)\mu"$ of motion at the transducer which for a typical disc drive amounts to $[(2.73-8.19)\times10^{-3}]°$ of arm rotation.

In yet a further embodiment, the present invention relates to a method of creating a servo track on a rotating disc of a disc drive. The method includes the steps of providing an actuator assembly having a transducer for writing in the servo track on the rotatable disc. A voice coil motor is operatively connected to the actuator assembly and operable to move the transducer in response to an input signal. The method further includes injecting a time variable input signal to the voice coil motor to cause the transducer to move during writing of the servo track so that the radial distance between a center line of the servo track relative to the axis of rotation of the disc varies on angular displacement about the axis.

Preferably the method further includes creating a correction factor for the servo system which is utilized by the servo system during track following operation.

These and other features as well as advantages which characterize the present invention will be apparent upon reading of the following detailed description and review of the associated drawings.

DETAILED DESCRIPTION

Figure 1:
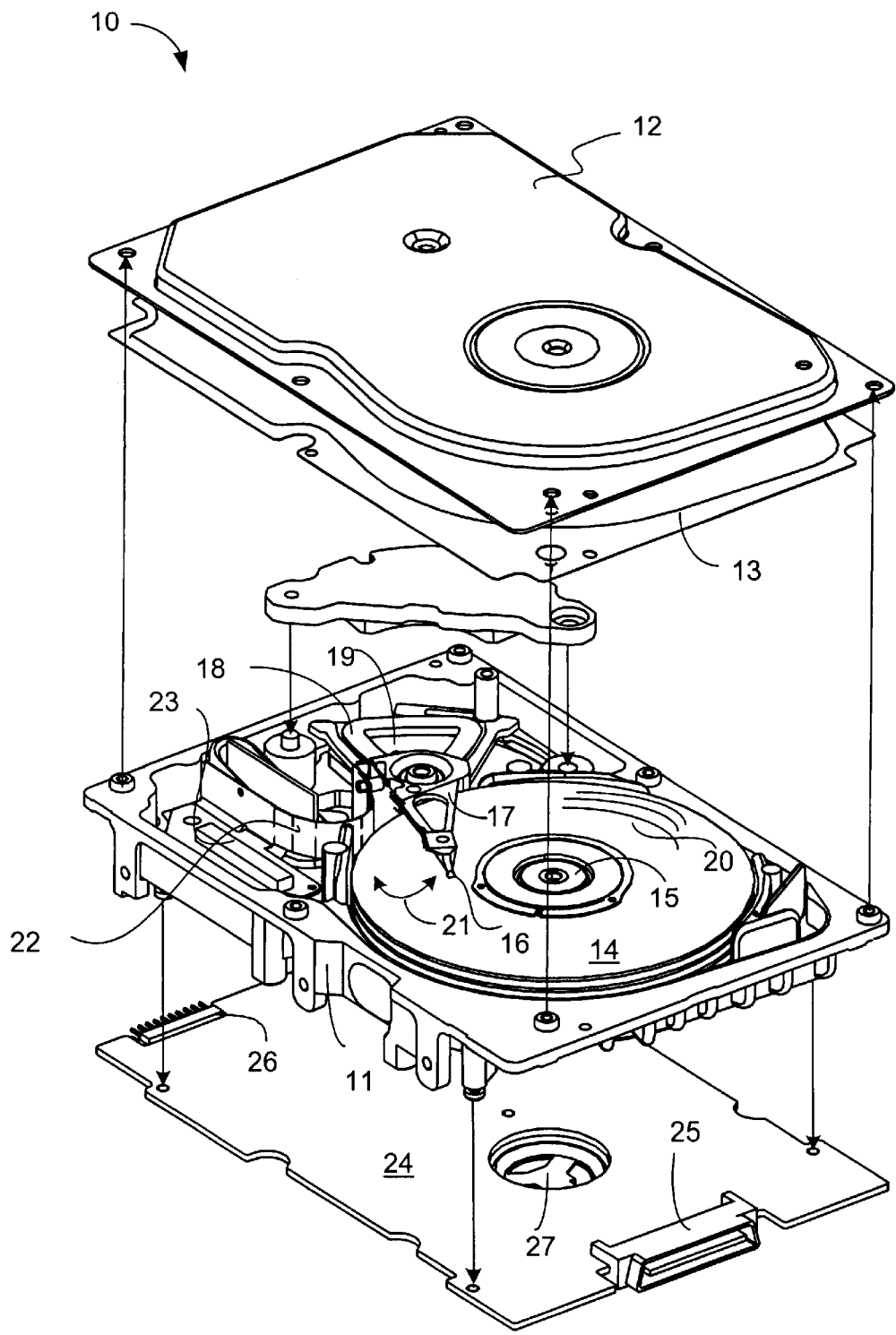
FIG. 1 is an exploded view of a hard disc drive.

FIG. 1 shows a disc drive 10 in exploded view. Briefly, the disc drive 10 includes a housing base 11 and a top cover 12, which engage a gasket 13 to form a sealed housing that maintains a clean environment inside the disc drive 10. A plurality of discs 14 are mounted for rotation on a spindle motor hub 15. A plurality of transducer heads 16 are mounted to an actuator body 17. The actuator body 17 is adapted for pivotal motion under control of a voice coil motor (VCM) including a voice coil 18 and magnets 19 to controllably move a head 16 to a desired track 20 along an arcuate path 21. Signals used to control the VCM and the heads 16 pass via a flex circuit 22 and a connector 23 to and from electronic circuitry on controller board 24. The controller board 24 includes a fibre channel interface 25, a serial port connector 26 and a spindle connector 27. The actuator assembly which includes the actuator body 17 and transducers 16 is mounted on the base 11 via a pivot mechanism 30, sometimes termed a pivot mechanism.

Figure 2:
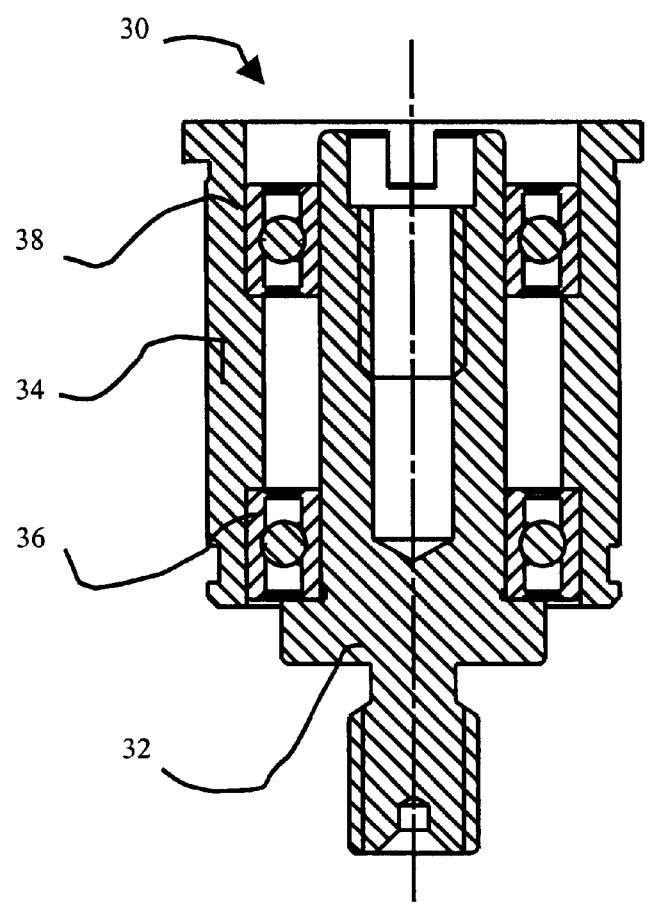
FIG. 2 is a cross-section view of the pivot bearing cartridge of FIG. 1.

The pivot mechanism 30 (see FIG. 2) is made up of a shaft 32 on which is mounted a housing 34 via two spaced annular ball bearing sets 36, 38. The actuator body 17 is attached to the housing 34. The ball bearings 36, 38 are positioned so that each exerts a small axial force on the other. This force is known as a pre-load. It eliminates internal clearances in the bearing sets 36, 38, but requires careful adjustment so as to ensure adequate dynamic properties without unacceptably increasing the frictional resistance to rotation of the housing 34 and thus of the actuator body 17 and transducers 16.

The discs 14 are operative to include data storage tracks which are aligned in generally concentric rings about the spindle axis. The center lines of the individual data storage tracks are defined by servo information which is pre written into the disc drive and which is read by one of the transducers 17.

The data storage tracks are closely aligned and accordingly, the transducers must be positioned with great precision by the VCM. The actuator 17 positioning is controlled by a closed loop servo system having feedback generated by the transducer reading the servo information.

In accordance with the first embodiment of the invention, the servo tracks which are pre written in are designed to be non circular which in turn dictates that the individual data storage tracks made during operation of the disc drive will be non circular. In particular, the servo track is generated by introducing a sinusoidal signal into the actuator VCM controlling the writing the servo information. Further the sinusoidal signal is set at a frequency of the spindle rotation or its harmonic frequency.

Figure 3:
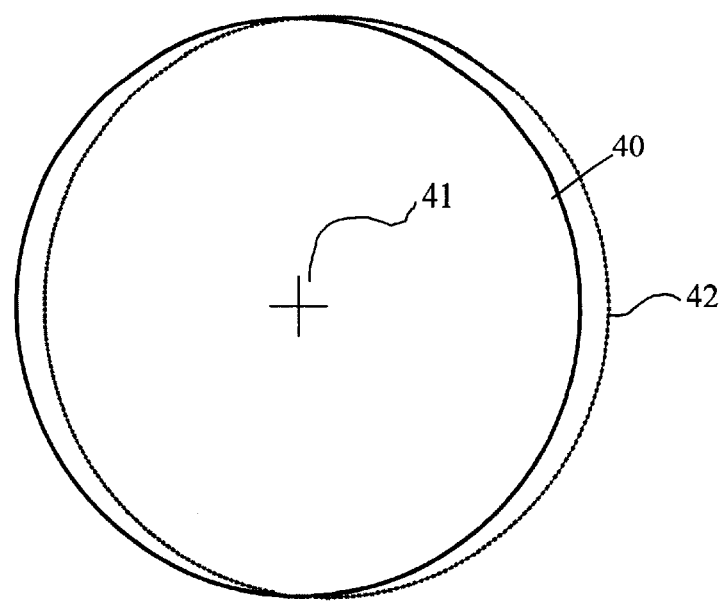
FIG. 3–5 are schematic views of the HDD illustrating the sinusoidal signal in the servo track.
Figure 4:
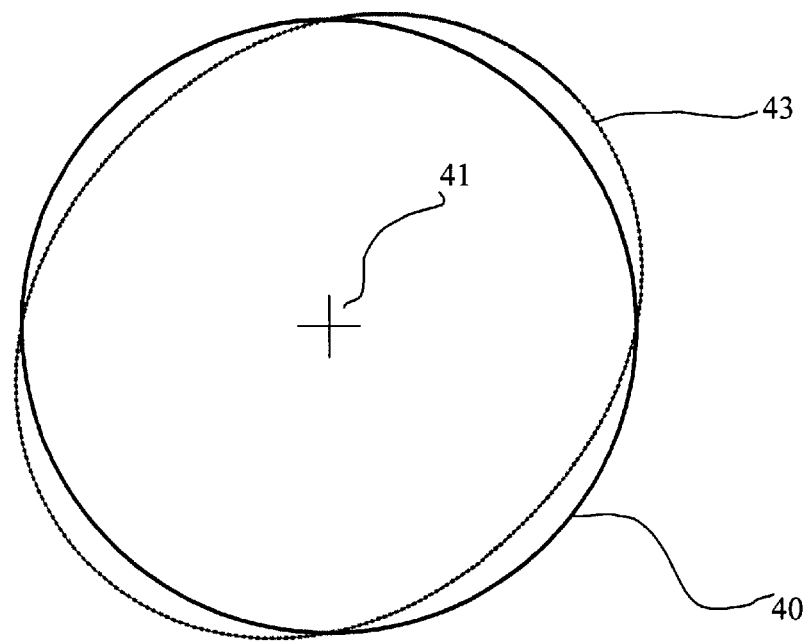
Figure 5:
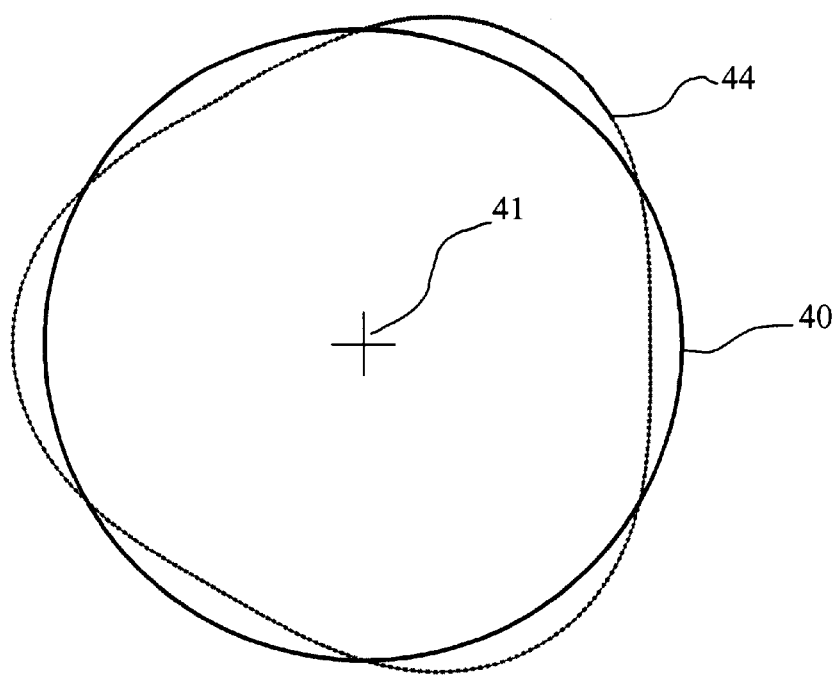

Using a spindle motor rotation speed of 5,400 rpm, which is typical of low end drives, a servo track is written in using an injected sinusoidal signal of 90 Hz, 180 Hz and 270 Hz is illustrated in FIGS. 3, 4 and 5 respectively.

Turning firstly to FIG. 3, the servo track 40 written in by a standard non time variable signal is circular relative to the spindle axis 41. When a 90 Hz sinusoidal signal is injected, the servo track written in is caused to distort as the actuator arm is caused to move through one cycle of the sinusoid on each single rotation of the disc. The resulting servo track is illustrated in FIG. 3 under reference 42.

In regard to FIG. 4, when a 180 Hz sinusoid signal is injected on servo writing, the actuator arm is caused to move through two cycles of the sinusoidal signal on each rotation of the disc giving a non circular servo track 43 as shown in FIG. 4. When a 270 Hz sinusoid is injected, the actuator arm moves through three cycles giving servo track 44 as depicted in FIG. 5.

The amplitude of the sinusoid signal determines the arc of movement of the actuator during servo track writing and therefore the extent of the distortion of the servo track being written in. Preferably, there is $(100–300)\mu"$ of motion at the transducer which is equivalent to $[2.73–8.19)\times10^{-3}]°$ of arm rotation.

Figure 6:
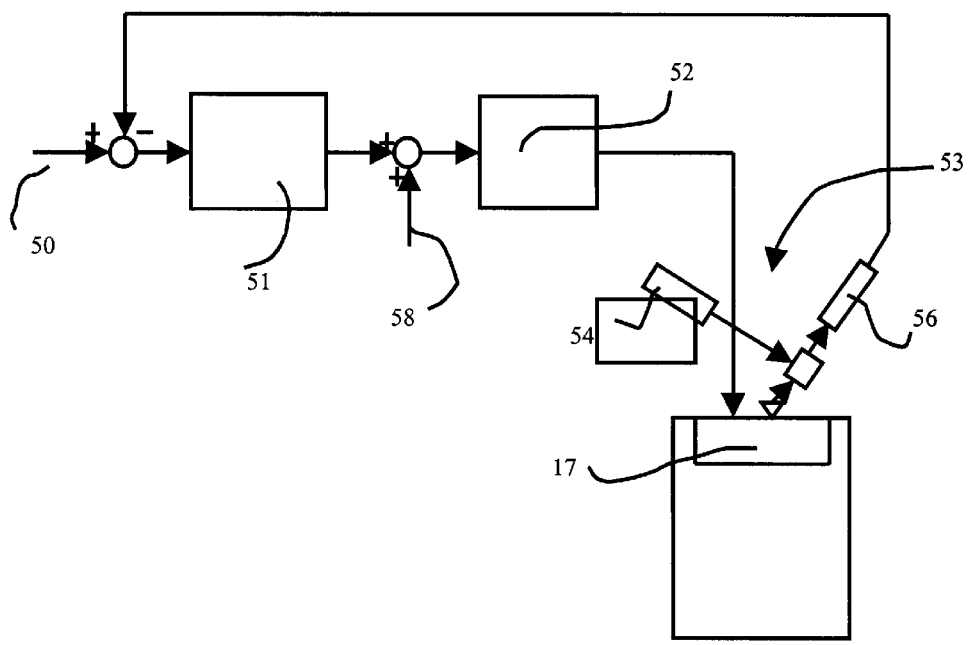
FIG. 6 is a schematic illustration of the sinusoidal signal being written in during servo track writing.

FIG. 6 illustrates the process of writing in the servo track information on to the disc drive 10.

In a typical set up, the actuator positioning is controlled by a closed loop servo system with the movement being driven by a voice coil motor (VCM). In this regard, an input signal 50 is injected which determines the position of the servo track being written in on the disc. This signal passes through servo controller 51 and actuator power amp 52 to the VCM which in turns drives the actuator to its designated position. An inferometer 53 incorporating a laser 54 and receiver 56 determines the precise position of the actuator relative to a predetermined position, so as to provide the feed back information to the servo controller to inject a correction signal to the actuator.

To provide the required distortion to the servo track, the sinusoid signal 58 is injected and summed to the servo corrected input signal. In this way, the sinusoidal signal may be introduced, and the resulting distorted non-circular servo track information may be produced, without requiring any significant changes to the disc drive design.

At the same time that the sinusoid signal is being written in during servo track writing, a correction signal 59 for use in the servo system is generated and stored, typically in a table, for retrieval during operation of the disc drive in track following operations.

Using a model of a hard disc drive as $P(s)=k/s^2$, the correction signal is defined as follows: $x=y/[G*P(s)]$, where x denotes the correction signal, y denotes the injected sinusoidal signal, G is defined as the gain of power amplitude, and P(s) is the HDD actuator model.

Figure 7:
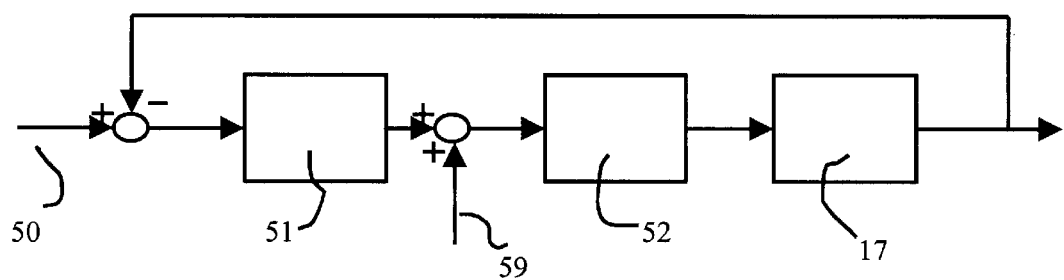
FIG. 7 is a schematic illustration of the operation of the actuator during track following.

The correction signal is a unique value for each servo sector and is directly used when retrieved from the table. As illustrated in FIG. 7, the correction signal 59 is retrieved from the table and injected as a signal to offset the amount of deviation from the track after the sinusoidal signal has been injected so as to correct the position of the actuator arm in use. This is achieved when the correction signal is taken into account when the signal is read from the table and calculations are made to ensure that the actuator is positioned on track.

Accordingly, the system in effect overlays the existing operation of the HDD with the injected sinusoidal signal 58 and corresponding correction signal 59. With the introduction of these overlaid signals, the data storage tracks follow a distorted path which causes the actuator assembly to move during track following operation to either store data on, or retrieve data from, the data storage tracks of the HDD. The purpose of the movement is to minimize the effects of friction from the pivot mechanism 30 to enable the actuator assembly 17 to exhibit more predictable behavior, particularly in the low frequency domain. This in turn improves the operating performance of the servo control system thereby enabling that system to be used for high density track applications in conjunction with the standard pivot mechanism configuration 30.

The improved performance of the HDD incorporating the sinusoidal signal is evident from concept testing discussed below in conjunction with FIGS. 9 to 11.

Figure 8:
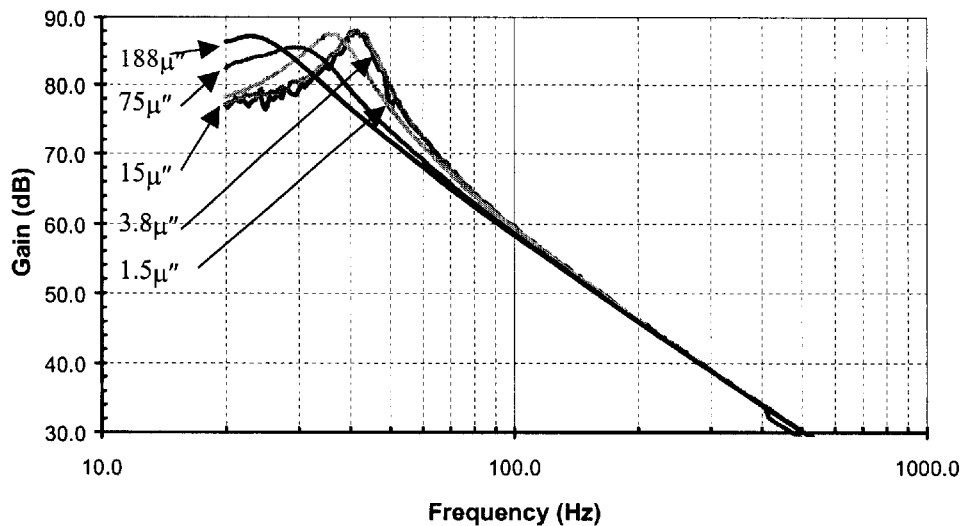
FIG. 8 is a Bode plot illustrating the actuator transfer function of prior art HDDs.

FIG. 8 is a Bode plot relating to testing conducted on a prior art HDD incorporating circular data storage tracks. The Bode plot measures Gain (dB) against the frequency supplied to the voice coil motor under different incremental actuator arm movements; namely $1.5\mu''$, $3.5\mu''$, $15\mu''$, $75\mu''$ and $188\mu''$.

The Gain (dB) is the logarithm of the actuator transfer function which is the amount of output per unit of input supplied and may be expressed as follows:

Gain (dB)=log|(output/input)| where
input is the current supplied to the voice coil motor which drives the actuator, and output is measured in angular displacement of the arm.

Using the model of the HDD of $P(s)=k/s^2$ the gain may be defined as follows:

Gain (dB)=20 log|P(s)|.

Using this model, in an ideal situation, the actuator behaves in a manner defined by the above equation with the gain of the actuator being directly proportional to the frequency in a linear plot.

However as illustrated from the test results displayed in the Bode plot of FIG. 8, in reality at low frequency, the actuator response is non linear particularly at low frequencies (ie less than 100 Hz). In particular the prior art HDD exhibits insufficient gain at low frequency, and also the gain at the low frequency reduces with decreasing the actuator movement.

Figure 9:
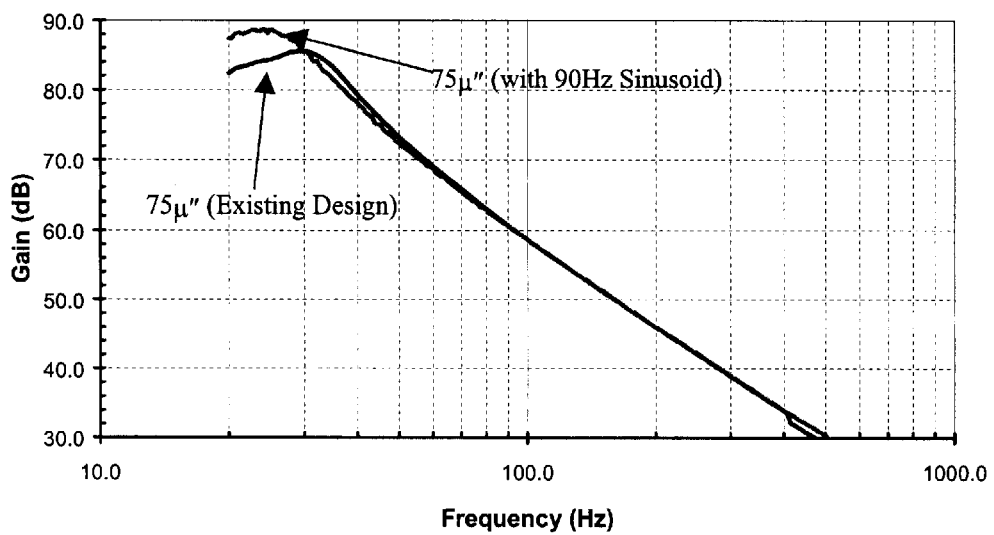
FIG. 9 is a Bode plot comparing the transfer function of existing design with a 90 Hz sinusoid signal.
Figure 10:
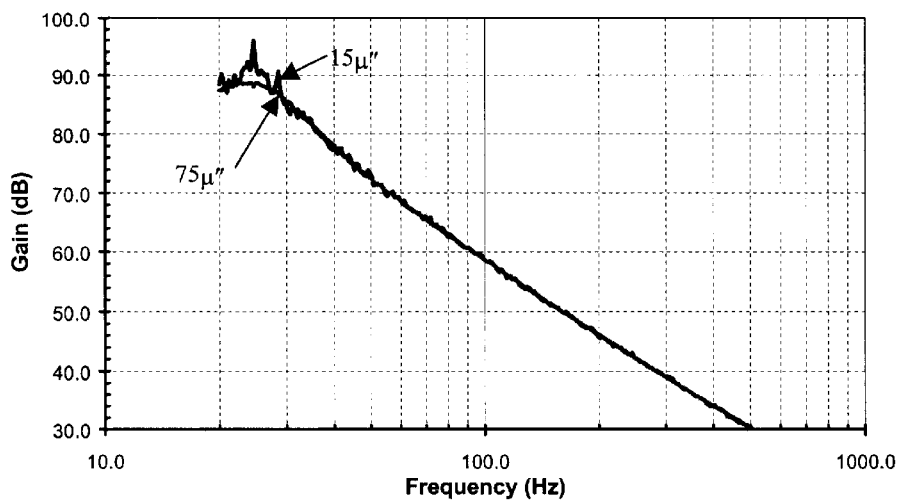
FIG. 10 is a Bode plot of the actuator transfer function with a 90 Hz sinusoid signal.

Turning now to FIG. 9, a similar Bode plot to that of FIG. 8 is illustrated for an actuator movement of $75\mu''$. Displayed in FIG. 9 is a comparison of an existing HDD design with circular data storage tracks against an HDD incorporating a 90 Hz injected sinusoidal signal into the servo system. As can be seen, the HDD which incorporates the injected sinusoidal signal exhibits substantial increase in gain at the low frequency as compared to the prior art design.

FIG. 10 is again a similar Bode plot to that disclosed in FIGS. 8 and 9 which illustrates the gain for the HDD incorporating a 90 Hz sinusoidal signal for actuator movements of $75\mu''$ and $15\mu''$. As can be seen, the behavior of the actuator arm for the different incremental movements of $75\mu''$ and $15\mu''$ is now far more similar to each other than that disclosed in the prior designs as illustrated in FIG. 8.

Figure 11:
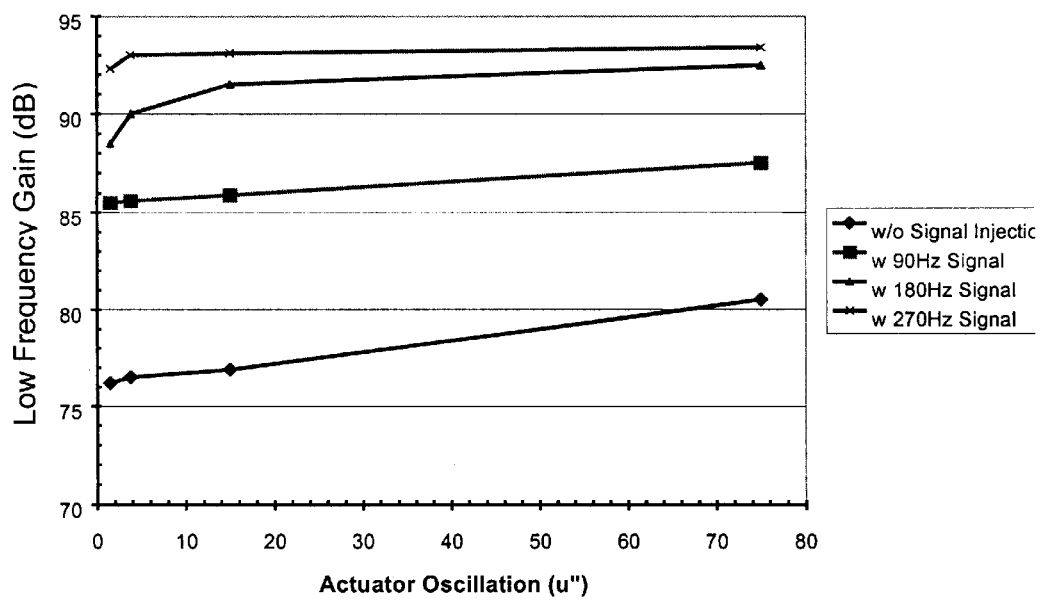
FIG. 11 is a plot comparing gain vs actuator oscillation for different signals at 20 Hz.

Finally, FIG. 11 is a comparison between the Gain (dB) at the low frequency of 20 Hz, against the actuator oscillation which is the amplitude of the actuator displacement expressed in micro inches ($\mu''$). As shown in FIG. 11, the Gain increases as the frequency of the injected signal increases. Furthermore, it is clear that the Gain for higher injected frequencies is greater than the Gain from an actuator without an injected signal. It also shows that with each increase in the frequency of the injected signal, the plot is shown as a decrease in gradient, thereby showing that the Gain becomes almost constant when the injected signal is at a high frequency such as 270 Hz.

Accordingly, by maintaining the actuator arm in motion during track following operations, the behavior of the actuator arm when required to move incrementally in track seek operations is substantially more predictable as evidenced by the improvement in Gain, especially in the low frequency domain. Further, it is considered by the applicant that the improvements in the behavior of the hard disc drive is contributable to the minimization of the effects of the bearing pivot mechanism which result from maintaining the actuator arm in motion during operation.

Figure 12:
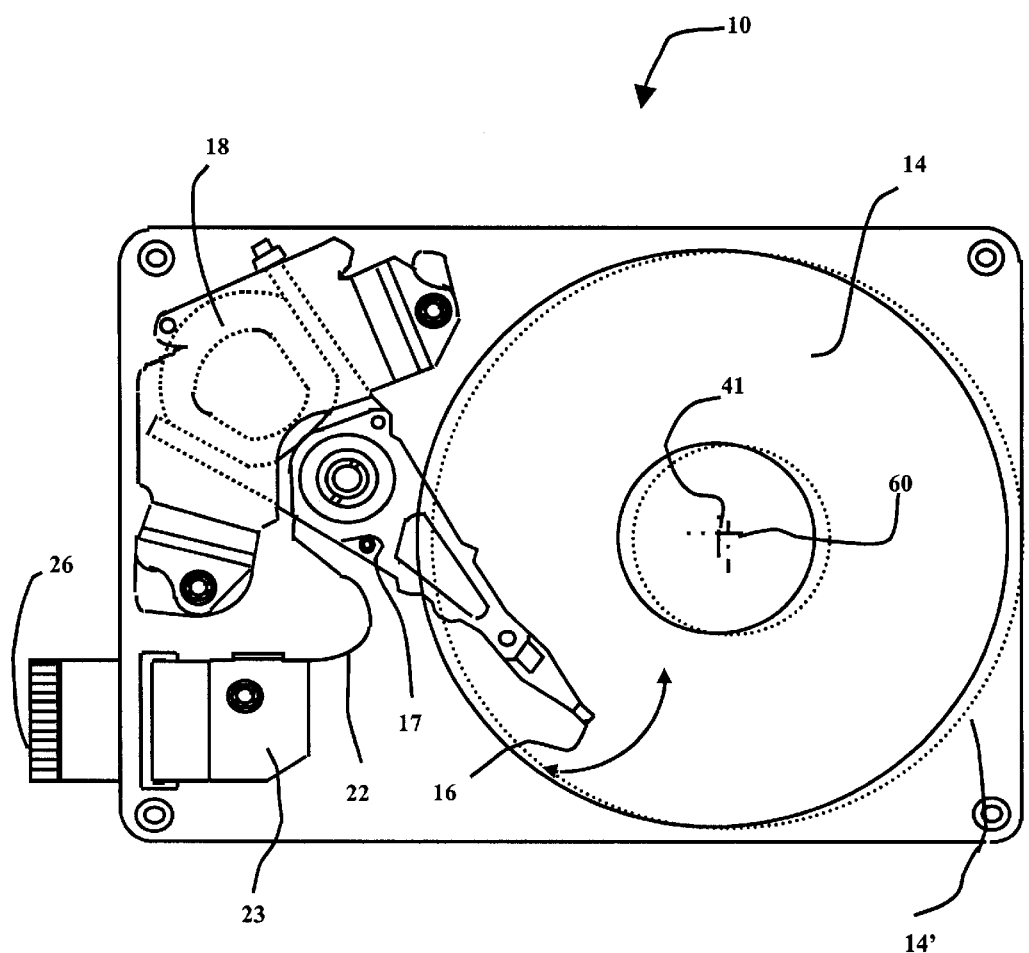
FIG. 12 is an alternative form of HDD which incorporates an offset axis of disc rotation.

FIG. 12 illustrates an alternative arrangement by which the actuator arm may be caused to move during the track following operation. As the same components of the hard disk drive are used in this second embodiment, like features have been given like reference numerals.

In the embodiment of FIG. 12, the servo track is written in a conventional form resulting in circular servo tracks which are concentric about the axis of rotation of the disc. However, after servo track writing, the disc 14 is laterally shifted to position 14' so that the spindle axis 41 is offset from the central axis 60 of the disc. This induced eccentricity results in a distortion in the path of the servo track relative to the axis of rotation of the disc 14' which in turn will cause the actuator arm to remain in motion during track following operations. The amount of lateral movement will determine the amplitude of movement of the arm during track seek operations. Again, preferably there is $(100–300)\mu''$ of motion at the transducer which is equivalent to $[(2.73–8.19)\times10^{-3}]°$ of arm rotation.

Another method to describe the invention is as follows:

The present invention provides a disc drive 10 that comprises a base 11, a spindle hub 15 on the base 11 with a number of discs mounted rotatably about the spindle 15, where each disc has a plurality of data storage tracks 20. The disc drive also has an actuator assembly that is made up of a transducer 16 mounted on the actuator arm 17, which is mounted on the base via a pivot mechanism 30. In the disc drive there is a motor, operatively connected to the actuator assembly, such that the transducer 16 is positioned over a selected storage track 20 during a track following operation where the transducer 16 is able to retrieve data from, or store data on, the selected track 20. The radial distance between the center line of the selected data storage track and the spindle axis 41 vary on angular displacement about the spindle axis 41 so that the actuator arm 17 is operable to move about the pivot mechanism 30 during the track following operation. The radial distance of the center line, which is a continuous sinusoid, constantly changes on angular displacement about the spindle axis 41 so that the actuator arm 17 remain in motion throughout the track following operation. The center line of each of the data storage tracks 20 on the disc are substantially parallel to one another. During the track following operation, the actuator arm 17 moves through an arc during each revolution of the disc 14 such that the arc of movement is in the range of $[(2.73–8.19)\times10^{-3}]°$. The disc drive 10 also has a servo system to control the position of the actuator 17 with the position of the center line of the data storage tracks 20 defined by servo track information. The servo track information is written in on the disc 14 by the actuator assembly prior to the operation of the disc drive 10. The actuator assembly moves in response to a time variable input signal 50 to the motor. This causes the actuator assembly to move during writing in of the servo track information such that the radial distance of the center line of the data storage track 20 relative to the spindle axis 41 varies on angular displacement about the spindle axis 41. During the track following operation, the actuator assembly is operable to move in response to a time varying input signal 50 which includes a correction signal 59 generated from the time varying input signal 50 used in writing in of the servo track information. The center line of the selected data storage track is circular about a central axis 60, and the disc is mounted on the spindle in a position where the central axis 60 is offset from the spindle axis 41 in the range of $(100–300)\mu"$.

In another embodiment of the invention, a method for retrieving data from, or storing data on, a data storage track 20 on a rotating disc 14 of a disc drive 10 is provided. The method has a step providing a rotatable actuator assembly which is mounted to a base 11 of a disc drive 10 via a pivot mechanism 30. The actuator assembly is made up of a transducer 16 mounted on the actuator arm 17. The method also has a step positioning the transducer 16 over the data storage track 20 during a track following operation. Another step is provided to cause the actuator assembly to move about the pivot mechanism 30 during the track following operation where the transducer 16 retrieves data from, or stores data on, the storage track 20. The actuator arm 17 remains in motion throughout the track following operation and moves through an arc movement in the range of $[(2.73–8.19)\times10^{-3}]°$ during each rotation of the disc.

There is also provided a method of creating a servo track (40, 42, 43, 44) on a rotating disc 14 of a disc drive 10 where the servo track (40, 42, 43, 44) defines the center line of a data storage track 20 on a disc 14 of the disc drive 10. The method has a step that provides an actuator assembly with a transducer 16 for writing in the servo track on the rotating disc 14. Another step provides a motor operatively connected to the actuator assembly to move the transducer 16 in response to an input signal 50. In another step, the motor is provided a time variable input signal 50 to cause the transducer 16 to move during writing of the servo track (40, 42, 43, 44). This result in a radial distance between a center line of the servo track and the axis of rotation of the disc to vary on angular displacement about the axis. The time variable input signal 50 is periodic and sinusoidal. The period of this input signal is equivalent to the spindle rotation frequency or a harmonic frequency of the spindle rotation frequency. A correction signal 59 is generated from the time varying signal 50 used in writing in the servo track. During operation of the disc drive 10, the correction signal 59 is used to position the actuator assembly during a track following operation where the transducer 16 retrieves data from, or store data on, the data storage track 20 defined by the servo track (40, 42, 43, 44).

It is to be understood that even though numerous characteristics and advantages of various embodiments of the present invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application for the disc drive while maintaining substantially the same functionality without departing from the scope and spirit of the present invention. In addition, although the preferred embodiment described herein is directed to a hard disc drive, it will be appreciated by those skilled in the art that the teachings of the present invention can be applied to other systems, without departing from the scope and spirit of the present invention.

What is claimed is:

1. A disc drive comprising:
   a drivable spindle,
   a disc rotatably mounted about an axis of a spindle, the disc including at least one data storage track,
   a rotatable actuator assembly which is rotated in conjunction with a pivot mechanism, the rotatable actuator assembly includes an actuator arm and a transducer mounted on the actuator arm; and
   a motor that operates the actuator assembly to position the transducer over the at least one storage track, wherein purposefully induced eccentricity is provided between the at least one storage track and the axis of the spindle.

2. A disc drive according to claim 1, wherein the eccentricity is provided by the at least one storage tack being written eccentric to an axis of the disc.

3. A disc drive according to claim 2, wherein the at least one storage track is written eccentric by injecting a time variable input signal to write servo track information associated with the at least one data storage track.

4. A disc drive according to claim 3, wherein the servo track information is written by the actuator assembly, the actuator assembly being movable in response to the time variable input signal to the motor so as to cause the actuator assembly to move during writing of the servo track information so that the at least one data storage track is eccentric relative to the spindle axis.

5. A disc drive according to claim 3, wherein during a track following operation, the actuator assembly is operable to move in response to another time varying input signal which includes a correction signal.

6. A disc drive according to claim 1, wherein the eccentricity is provided to minimize an effect of the pivot mechanism.

7. A disc drive according to claim 1, wherein the eccentricity creates a continuous sinusoid in the at least one data storage track.

8. A disc drive according to claim 7, wherein the sinusoid has a frequency that is an integer multiple of a frequency of rotation of the disc.

9. A disc drive according to claim 1, wherein the correction signal is generated from the time varying input signal used in writing of the servo track information.

10. A disc drive according to claim 1, wherein eccentricity is provided by mounting the disc on the spindle in a position where the at least one date storage track is eccentric to the spindle axis.

11. A method according to claim 1, wherein the actuator arm is caused to move through an arc during each rotation of the disc, and wherein the arc of movement is in the range of $(2.73–8.19)\times10^{-3}$ degrees.

12. A method of retrieving data from or storing data to a data storage track on a rotating disc of a disc drive, the method including a step of causing a rotatable actuator assembly to pivot about a pivot mechanism responsive to intentionally generated eccentricity.

13. A method according to claim 12, wherein the eccentricity is between the data storage track and a spindle axis.

14. A method according to claim 12, wherein the eccentricity is caused by writing servo track information for the data storage track responsive to a first time variable input signal.

15. A method according to claim 14, wherein the data storage track is followed responsive to a second time variable input signal that is generated from the first time variable input signal.

16. A method according to claim 12, wherein the eccentricity is caused by mounting the disc so that the data storage track is eccentric to a spindle axis.

17. A method for at least one of reading and writing a servo track on a rotating disc of a disc drive, the servo track defining a center line of a data storage track on the disc of the disc drive, the method including steps of:
  providing an actuator assembly having a transducer for at least one of reading and writing the servo track on the rotating disc;
  providing a motor operatively connected to the actuator assembly and operable to move the transducer in response to an input signal; and
  providing a time variable input signal to the motor to cause the transducer to move during at least one of reading and writing of the servo track, the time variable input signal associated with purposefully caused eccentricity.

18. A method according to claim 17, wherein the time variable input signal is periodic having a period equal to an integer multiple of a spindle rotation frequency.

19. A method according to claim 18, wherein the periodic time variable input signal is a sinusoid.

20. A method according to claim 17, wherein a correction signal is generated from the time variable input signal used in writing the servo track, wherein the correction signal is operable to be used during operation of the disc drive in positioning of the actuator assembly during a track following operation where the transducer is operable to retrieve data from and store data on the data storage track defined by the servo track.

* * * * *